(No Model.)
A. H. CARROLL.
HOOF CLAMP.
No. 309,690. Patented Dec. 23, 1884.
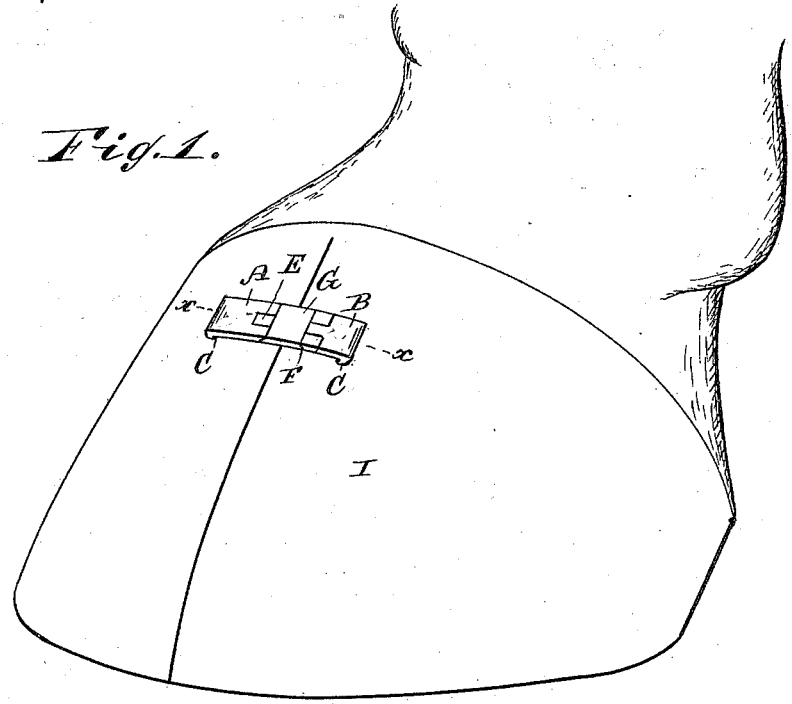
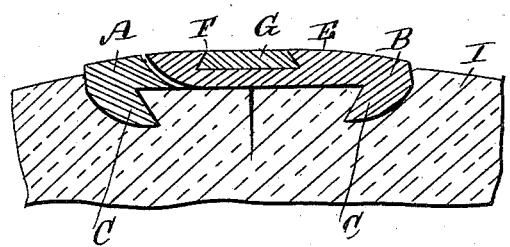
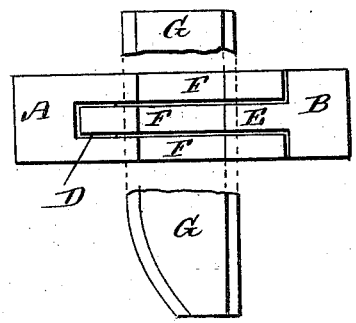
WITNESSES:
Theo. G. Hoster
C. Sedgwick
INVENTOR:
A. H. Carroll
BY Munn & Co
ATTORNEYS.

UNITED STATES PATENT OFFICE.

ALEXANDER H. CARROLL, OF PHILADELPHIA, PENNSYLVANIA.

HOOF-CLAMP.

SPECIFICATION forming part of Letters Patent No. 309,690, dated December 23, 1884.

Application filed June 19, 1884. (No model.)

*To all whom it may concern:*

Be it known that I, ALEXANDER H. CARROLL, of Philadelphia, in the county of Philadelphia and State of Pennsylvania, have invented a new and Improved Hoof-Clamp, of which the following is a full, clear, and exact description.

The object of my invention is to provide a new and improved hoof-clamp for holding split hoofs together until the parts have grown together again, and the clamp is then removed.

The invention consists in a hoof-clamp formed of two clips, each provided on the inner surface with a hook-prong at the end, and with a transverse dovetail groove in the front surface, and of a key fitting in the groove for holding the clips or sections together.

Reference is to be had to the accompanying drawings, forming a part of this specification, in which similar letters of reference indicate corresponding parts in all the figures.

Figure 1 is a perspective view of a hoof provided with my improved hoof-clamp. Fig. 2 is an enlarged sectional plan view of the same on the line $x\,x$, Fig. 1. Fig. 3 is a front view of the clamp, parts being broken out.

The clamp is formed of two clips, A and B, each provided at its outer end with a hook-prong, C, on the inner surface, the hook-prongs projecting toward those ends of the sections opposite the ones on which they are formed. The section or clip A is provided with a longitudinal slit, D, extending from the end opposite the one provided with the prong C toward the said prong, and the section or clip B is provided with a tongue, E, fitting in the slit D, and extending from that end of the clip provided with the prong. The slit and tongue are about of the same length. In the outer surfaces of the clip A and the tongue E dovetail transverse grooves F are formed. A groove is cut in the surface of the hoof I across the split part, and at each end of the groove a cavity is formed for receiving the prongs C. The clips are placed into the groove in the hoof, the prongs C being passed into the cavities provided for them, and the tongue E being in the slit D. A dovetailed slightly wedge-shaped key, G, is driven through the dovetail grooves F, and draws the clips or sections A B together and locks them in place. The projecting ends of the key G are then filed off flush with the top and bottom edges of the clamp, to prevent the key being knocked out accidentally. When the two parts of the hoof have grown together and united perfectly, the clamp is removed, after first drawing out the key. The clamp is held securely in place and cannot drop off, and it prevents mud and dirt from passing into the split. It is simple in construction, and can be applied by any farmer or farrier.

Having thus described my invention, I claim as new and desire to secure by Letters Patent—

In a hoof-clamp, the combination, with the clips A B, provided with hook-prongs C on the inner surfaces at the ends, and transverse dovetailed grooves in the outer surfaces, of a dovetailed key fitting in the grooves, substantially as herein shown and described.

ALEXANDER H. CARROLL.

Witnesses:
C. F. SCHROEDER,
F. ELLWOOD COX.